United States Patent
George et al.

(10) Patent No.: US 12,305,786 B2
(45) Date of Patent: *May 20, 2025

(54) SYSTEM AND METHOD FOR A SIMPLIFIED HIGH PRESSURE MONOBORE MULTIPORT POD MISSILE

(71) Applicant: Aladdin Capital, Inc., Souix Falls, SD (US)

(72) Inventors: Paul Stuart George, Denver, CO (US); Robert C. Dacar, Spearfish, SD (US); Leroy Tanner Dickinson, Casper, WY (US); Kyle Lee Barnoff, Denver, CO (US); Marcus Curtis Dacar, Spearfish, SD (US)

(73) Assignee: Aladdin Capital, Inc., Souix Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,549

(22) Filed: Dec. 16, 2022

(65) Prior Publication Data

US 2023/0123229 A1    Apr. 20, 2023

Related U.S. Application Data

(63) Continuation of application No. 16/899,332, filed on Jun. 11, 2020, now Pat. No. 11,536,406.

(51) Int. Cl.
| | | |
|---|---|---|
| *F16L 41/02* | (2006.01) | |
| *E21B 43/26* | (2006.01) | |
| (Continued) | | |

(52) U.S. Cl.
CPC ........ *F16L 41/023* (2013.01); *E21B 43/2607* (2020.05); *F04B 23/04* (2013.01);
(Continued)

(58) Field of Classification Search
CPC ....... F16L 41/03; F16L 41/023; F16L 41/021; E21B 43/2607

See application file for complete search history.

(56) References Cited

U.S. PATENT DOCUMENTS

| | | | |
|---|---|---|---|
| 1,505,208 A | * | 8/1924 | Larner .................. F16L 41/023 285/133.11 |
| 7,478,673 B2 | | 1/2009 | Boyd |
| (Continued) | | | |

FOREIGN PATENT DOCUMENTS

| | | |
|---|---|---|
| CN | 203531876 U | 4/2014 |
| CN | 105221130 A | 1/2016 |
| (Continued) | | |

OTHER PUBLICATIONS

GE Oil & Gas, Shale 360 Services Vertical Frac Manifold, geoilandgas.com/pressurecontrol, Applicant Admitted Prior Art.
(Continued)

*Primary Examiner* — Atif H Chaudry
(74) *Attorney, Agent, or Firm* — AVEK IP, LLC (57) ABSTRACT

A modular multiport pod missile includes a plurality of pipe sections securable together to form a conduit for transporting a fluid in a generally horizontal direction of travel, and at least one pod secured between two of the pipe sections forming the conduit. Each pod has a plurality of input ports extending radially outwardly at an angle from a perimeter of the pod. Each of the input ports is configured for connection to a high-pressure line for delivering a high-pressure fluid from a pump to the conduit. The input ports are angled such that, when connected to a high-pressure line, high-pressure fluid flowing through the input ports merges with the fluid in the conduit generally in the same direction of travel as the fluid in the conduit.

13 Claims, 7 Drawing Sheets

(51) Int. Cl.

| | |
|---|---|
| *F04B 23/04* | (2006.01) |
| *F04B 23/06* | (2006.01) |
| *F04C 14/02* | (2006.01) |
| *F04C 28/02* | (2006.01) |
| *F04D 13/12* | (2006.01) |
| *F04D 13/14* | (2006.01) |
| *F04D 15/02* | (2006.01) |
| *F15B 11/17* | (2006.01) |
| *F16L 41/03* | (2006.01) |

(52) U.S. Cl.
CPC ............. *F04B 23/06* (2013.01); *F04C 14/02* (2013.01); *F04C 28/02* (2013.01); *F04D 13/12* (2013.01); *F04D 13/14* (2013.01); *F04D 15/029* (2013.01); *F15B 11/17* (2013.01); *F16L 41/021* (2013.01); *F16L 41/03* (2013.01); *Y10T 137/4857* (2015.04); *Y10T 137/86163* (2015.04)

(56) References Cited

U.S. PATENT DOCUMENTS

| | | |
|---|---|---|
| 8,151,885 B2 | 4/2012 | Bull et al. |
| 8,474,521 B2 | 7/2013 | Kajaria et al. |
| 8,496,062 B2 | 7/2013 | Kajaria et al. |
| 8,839,867 B2 | 9/2014 | Conrad |
| 9,568,138 B2 | 2/2017 | Arizpe et al. |
| 9,995,102 B2 | 6/2018 | Dille et al. |
| 10,436,368 B2 | 10/2019 | Kajaria et al. |
| 10,538,973 B2 | 1/2020 | Hill et al. |
| 11,536,406 B2 * | 12/2022 | George .................. F16L 41/03 |
| 2004/0251018 A1 * | 12/2004 | McLeod ................. E21B 43/26 166/75.13 |
| 2009/0044619 A1 | 2/2009 | Fiering et al. |
| 2014/0128297 A1 | 5/2014 | Conrad |
| 2018/0187537 A1 | 7/2018 | Hill et al. |
| 2021/0148500 A1 * | 5/2021 | Farquharson .......... E21B 43/26 |

FOREIGN PATENT DOCUMENTS

| | | | |
|---|---|---|---|
| CN | 205778793 U | | 12/2016 |
| CN | 105221130 | * | 11/2018 |
| CN | 110374575 A | | 10/2019 |
| CN | 210035075 U | | 2/2020 |

OTHER PUBLICATIONS

Kimble Manufacturing Company, Kimble High Pressure Manifold Trailer Brochure, www.kimblechassis.com, Akron, Ohio, Applicant Admitted Prior Art.

Weir Oil & Gas, Safety Iron Manifold Trailer Operation Manual, Jan. 30, 2013.

* cited by examiner

SYSTEM AND METHOD FOR A SIMPLIFIED HIGH PRESSURE MONOBORE MULTIPORT POD MISSILE

CROSS-REFERENCE TO RELATED APPLICATIONS

This application is a continuation of U.S. patent application Ser. No. 16/899,332, filed Jun. 11, 2020 entitled "System and Method for a Simplified High Pressure Monobore Multiport Pod Missile," the disclosure of which is incorporated by reference herein in its entirety.

BACKGROUND

High pressure manifolds are used in hydraulic fracturing applications to aggregate high pressure fracturing fluids from multiple hydraulic fracturing pumps. These manifolds are commonly referred to as missiles, or manifold trailers. Many designs are used but in general they are portable, mounted on mobile transport trailers, are upwards of 60 feet in length, and are used to connect 10-20 high pressure fracturing pumps.

More specifically, missiles are placed in the middle of 10-20 hydraulic fracturing pumps, a blender, and the wellhead. They are generally configured with two primary high-pressure lines running the length of the trailer that gather high pressure fracturing fluids from multiple fracturing pumps, aggregate or consolidate the flow, and then direct the consolidated high-pressure hydraulic fracturing fluids towards the wellhead. They also generally have two low pressure lines running the length of the trailer which receive low pressure hydraulic fracturing fluid from the blender, then distribute the low-pressure hydraulic fracturing fluid out to the individual hydraulic fracturing pumps.

Missiles are subject to a significant amount of stress over their lifetimes due to the harsh environment in which they operate. However, even with recent advancements in technology, the missiles that are currently in use leave a lot to be desired.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, a modular multiport pod missile includes a plurality of pipe sections securable together to form a conduit for transporting a fluid in a generally horizontal direction of travel, and at least one pod secured between two of the pipe sections forming the conduit. Each pod has a plurality of input ports that extend radially outwardly at an angle from a perimeter of the pod. Each of the input ports is configured for connection to a high-pressure line for delivering a high-pressure fluid from a pump to the conduit. The input ports are angled such that, when connected to a high-pressure line, high-pressure fluid flowing through the input ports merges with the fluid in the conduit generally in the same direction of travel as the fluid in the conduit.

In another embodiment, a multiport pod missile includes a plurality of pipe sections securable together to form a conduit for transporting a fluid in a direction of travel, and a pod secured between two of the pipe sections forming the conduit. The pod includes a plurality of input ports extending radially outwardly at an angle from a perimeter of the pod. The input ports are angled such that, when connected to a high-pressure line, high-pressure fluid flowing through the input ports merges with the fluid in the conduit generally in the same direction of travel as the fluid in the conduit.

In still another embodiment, a method of combining high-pressure fluids via a multiport pod missile system includes (1) providing first and second multiport pods, each multiport pod comprising a plurality of input ports extending radially outward from a center of the pod; (2) securing a first end of a first section of pipe to a first side of the first multiport pod; (3) securing a first end of a second section of pipe to a second side of the first multiport pod; (4) securing a second end of the second section of pipe to the second multiport pod; (5) securing a first end of a third section of pipe to a second side of the second multiport pod; (6) attaching a fluid line to at least one of the input ports of the first and second multiport pods; and (7) pumping a fluid through the fluid line into the input ports, wherein the fluid enters the respective section of pipe at an angle of less than 90 degrees.

BRIEF DESCRIPTION OF THE DRAWINGS

The drawings illustrate exemplary embodiments of the invention and various objects and features thereof. Reference to the drawings may, as part of the specification, aid in a complete understanding of the invention.

WRITTEN DESCRIPTION

Every prior art missile generally has some basic characteristics. The missile is built with 3" and 4" high pressure flow iron. Equalization lines are used to balance pressure between the two primary high-pressure lines. 10-16 individual high-pressure input ports are distributed equally down each side, depending on the number of pumps at the site. For example, a trailer which is configured for 16 pumps would have 8 high pressure input ports on each side. Each port is used to connect an individual fracturing pump to the primary high-pressure lines. There are many connections, tees, valves, laterals, and pipe work used to make up the manifold. In typical manifolds, some connections are used that join high pressure fluids at less than 90 degrees. These connections are commonly referred to as laterals but they are generally distinguished as connecting only two fluid streams together at a common junction point.

Figure 1:
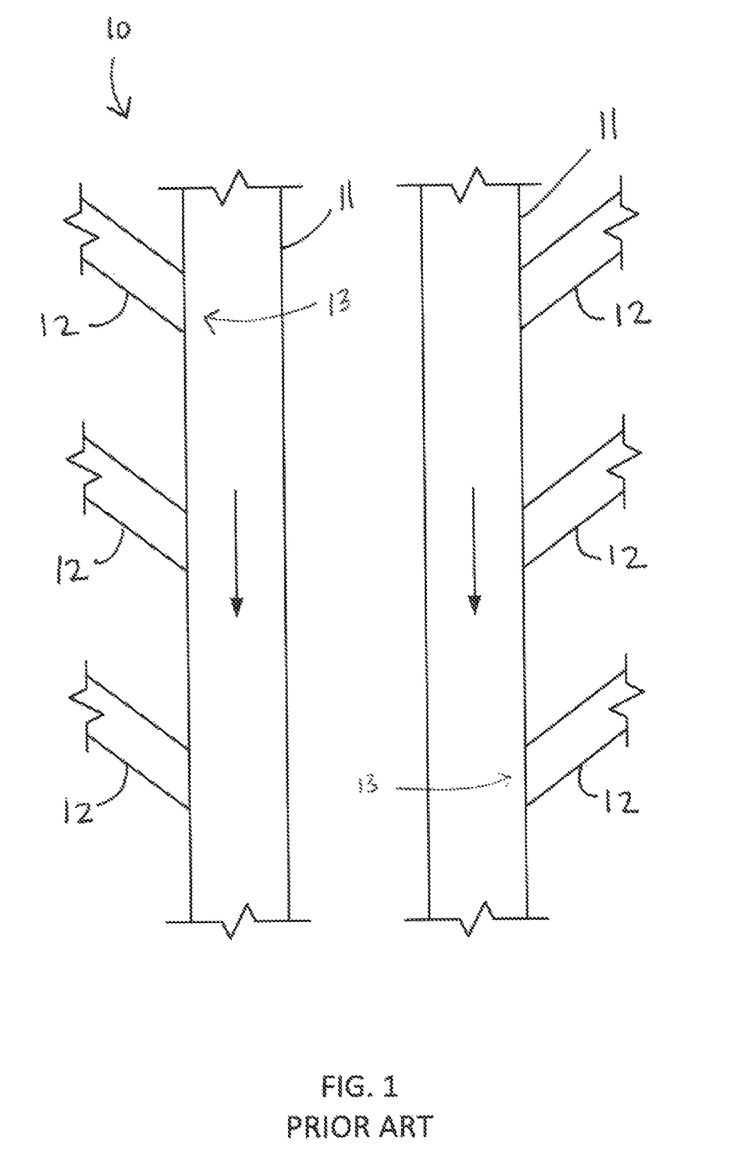
FIG. 1 is a schematic illustration of a prior art multi-bore manifold system.

FIG. 1 schematically illustrates the high-pressure portion of a typical prior art missile system 10. Missiles are typically placed in the middle of 10-20 hydraulic fracturing pumps, a blender, and the wellhead. They are generally mounted on a trailer, and configured with two primary high-pressure lines 11 running the length of the trailer that gather high pressure fracturing fluids from multiple fracturing pumps via pipes 12, aggregate or consolidate the flow in the line 11, and then direct the consolidated high-pressure hydraulic fracturing fluids towards the wellhead (i.e., in the direction of the arrows). As can be seen in FIG. 1, a junction area 13 is defined at each input port location (i.e., where the pipe 12 joins with the respective high-pressure line 11). Thus, the ratio of input ports to junction areas is 1:1. Although not shown in FIG. 1, each missile also usually has one or more low pressure lines running the length of the trailer which receive low pressure hydraulic fracturing fluid from the blender, then distribute the low-pressure hydraulic fracturing fluid out to the individual hydraulic fracturing pumps.

During winter operations it is very difficult to purge all of the fluids from the system because manifolds are made up of so many different connection types, sizes, and have openings at different elevations. Because the missiles are constructed using many different elevations, components, connections, ports, line sizes, etc., it is very difficult to achieve a well-balanced and well-operating system.

In addition to these issues, missiles are also subject to high stresses due to the harsh environments in which they operate. Very high pressures (in the order of 10,000 psi or more), vibration, variable fluid density, sand, erosion, fluid velocity, and pressure differentials are just some of the engineering concerns that must be accounted for in the safe design of manifold trailers. Missiles are subject to cracking and erosion because of, for example, the vibrations imparted by the individual pumps propagating fluid through the system; multiple fluid flow paths that are individually joined in turbulent flow at the junction areas 13; high resonance effects when the pump frequency of individual pumps becomes aligned; and turbulent fluid flows due to turns, bends, ports, and lack of opportunity for fluids to stabilize in laminar flow.

Various types of pressure waves and pulsation effects are generated by the reciprocating pumps in a hydraulic fracturing system. These pressure waves propagate through the system in both the fluid medium and the conduits containing the fluid. These waves are reflected, redirected, and interact based on such things as the angles of incidence of the reflecting interface, the fluid medium, the length of conduits, and the design of the conduits. Large high energy resonant frequencies can develop when these complex waves begin to sync. Individual or multiple pumps can begin to cross talk, and various wave frequencies can be amplified significantly. This is detrimental to the mechanical competence of the conduits, and affects system resistance to flow.

Figure 2:
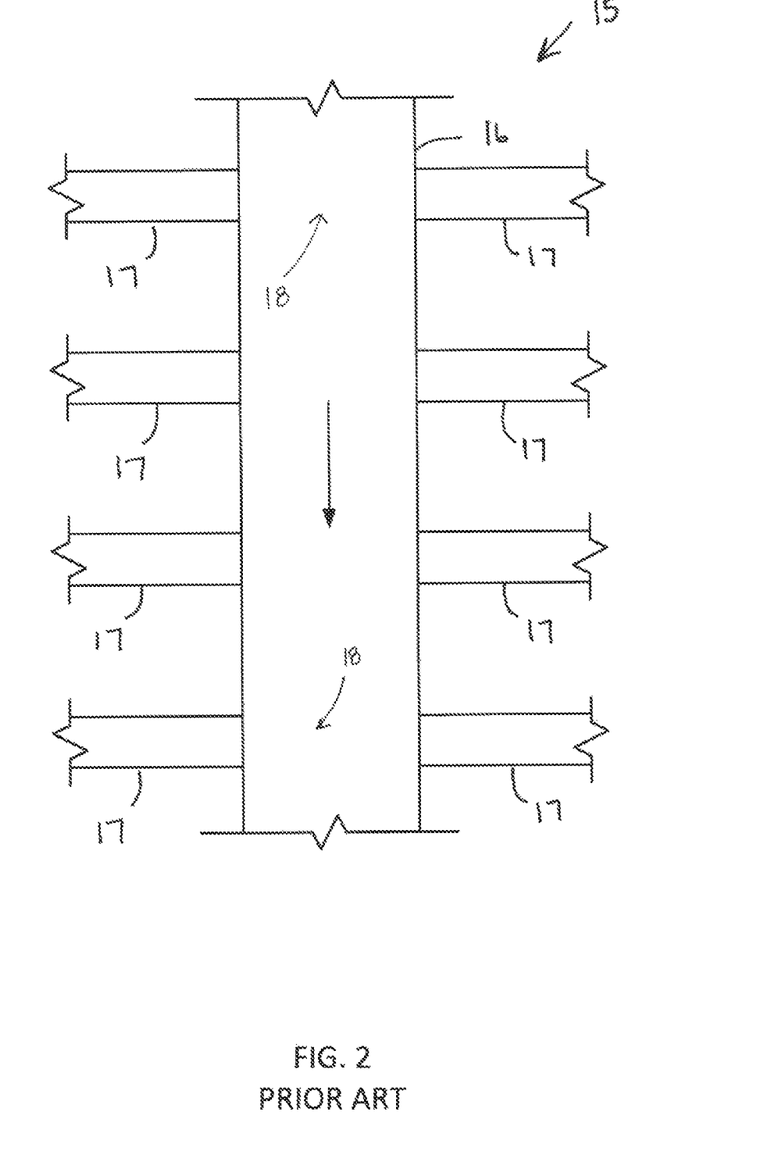
FIG. 2 is a schematic illustration of a prior art mono-bore manifold system.

The complexity of flow paths, connections and fluid dynamics that occur in a missile make it very difficult to build a reliable low-cost system that is not subject to failure. Nevertheless, the simplification of missile design has been ongoing over the last several years. This has been focused specifically on the high-pressure fluids side and the design has been moving towards monobore configurations. An example is illustrated in FIG. 2. In a monobore configuration 15 as illustrated in FIG. 2, instead of, for example, two 4" primary main lines to aggregate flow from the 10-20 hydraulic fracturing pumps, a single high-pressure line 16 having a larger diameter (referred to as a monobore) is used to aggregate the flow from multiple pipes 17 that deliver fluid from the pumps. This monobore configuration results in a missile that is heavier, has fewer connections, can be built out of larger diameter tubulars, and is generally simpler than a two-bore configuration. More specifically, the conduit 16 receives fluid from input ports distributed on both sides of the conduit 16 at a single junction area 18 such that the ratio of input ports to junction areas in a monobore configuration is 2:1.

While monobore systems exhibit improved qualities over multi-bore systems, the monobore systems that are in use now still have design issues. In many instances, the high-pressure input ports and flow junctures that join fluids together merge with the high-pressure line at angles in the order of 90 degrees. They still generally join three or less fluid flows together at a common junction point. The likelihood of resonance and pump crosstalk is still high because many 90 degree connection angles (or close to 90 degree angles), remain predominant. These junctions that are made at high angles enable reflection, transmission, and reverberation of pressure waves within the system. Efforts have been introduced to improve the individual flow blocks and/or single flow paths by adding curvatures, stress relieving junctures, and/or optimizing various stress points in the blocks, tees, and laterals. These improvements are all focused on an individual flow path, however, and little has been done to truly consolidate and orient multiple flow paths together. This means that there are still many areas where turbulent flow is generated, and a lack of areas where the system can stabilize in laminar flow.

The proposed systems and methods for assembly reduce the cost of build, number of connections, and simplify the aggregation of flow. This results in the elimination of individual high angle junctions and points where turbulent flow is induced, and improves areas for laminar flow to develop, stabilize and be maintained, and reduces points for propagation of reverberations and wave reflection.

Referring now to FIGS. 3-6, according to embodiments of the invention, a high-pressure fluid delivery system 100 includes a high pressure monobore multiport pod missile (MPM) 105 that is made up of individual pods 110 that are each capable of connecting multiple high-pressure input lines 117 at a single junction. Multiple pods 110 may be conjoined in series such that all flow is optimized in a common horizontal orientation that minimizes points of turbulence, cavitation, erosion, resistance, and pressure wave reflection, while aggregating total flow.

The pods 110 are connected to a conduit 115 for transporting a flowstream using high-pressure flanged connections. Many different connection types and sizes can be used to connect the conduits and the pod(s), and the conduits 115 can be ridged or flexible in design. The size of conduit used is dependent on the maximum flow velocity achieved at the output from each pod 110. As will be described in greater detail herein, the pods 110 are modular and can be spaced apart depending on how many input ports are conjoined at each pod 110, and the distance between pods 110 needed to space out the high pressure fracturing pumps 120 connected to each pod 110 to reduce turbulent flow within the conduit 115.

Figure 3:
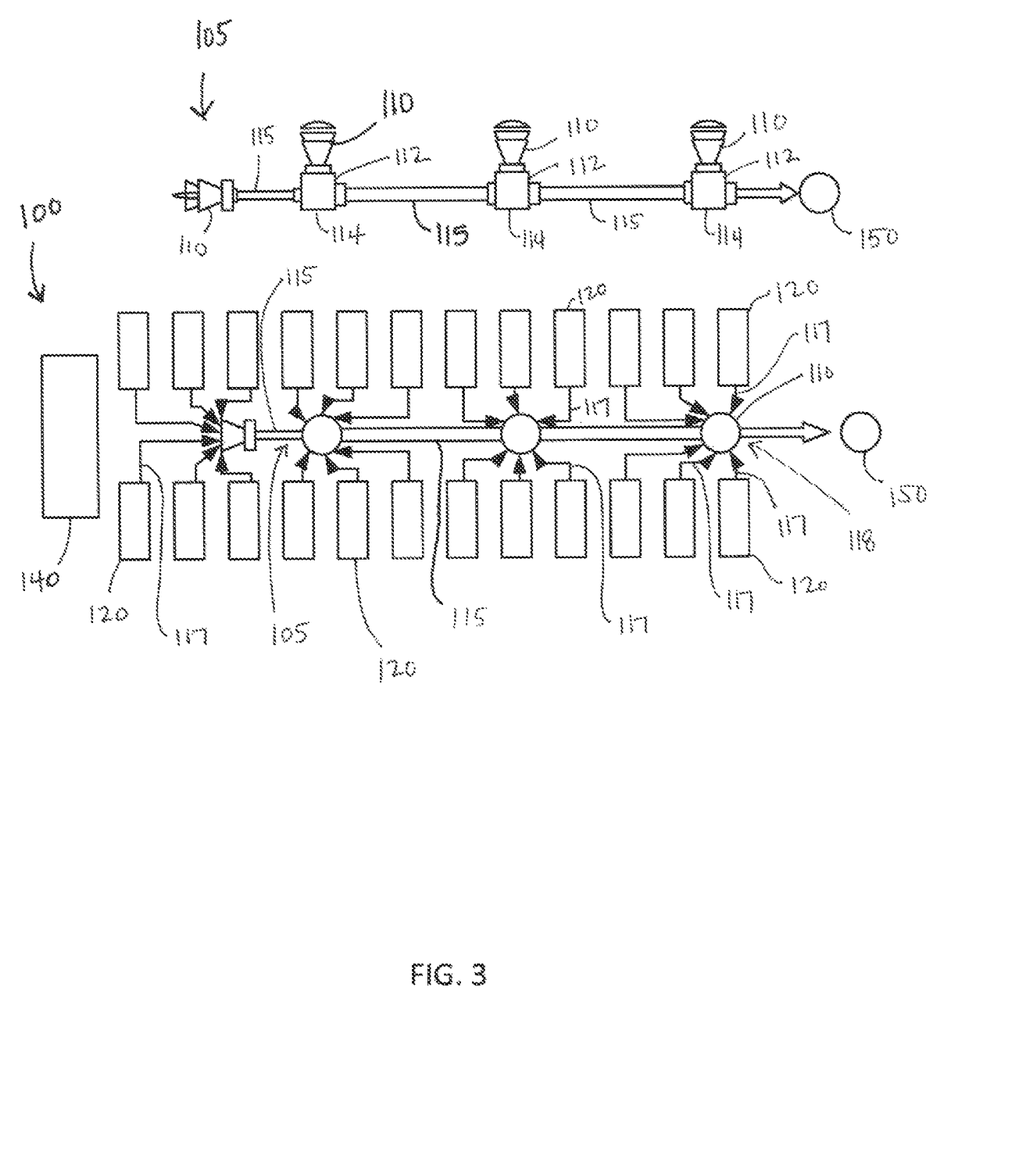
FIG. 3 is a schematic illustration of a monobore multi-port pod missile system according to embodiments of the invention.
Figure 3A:
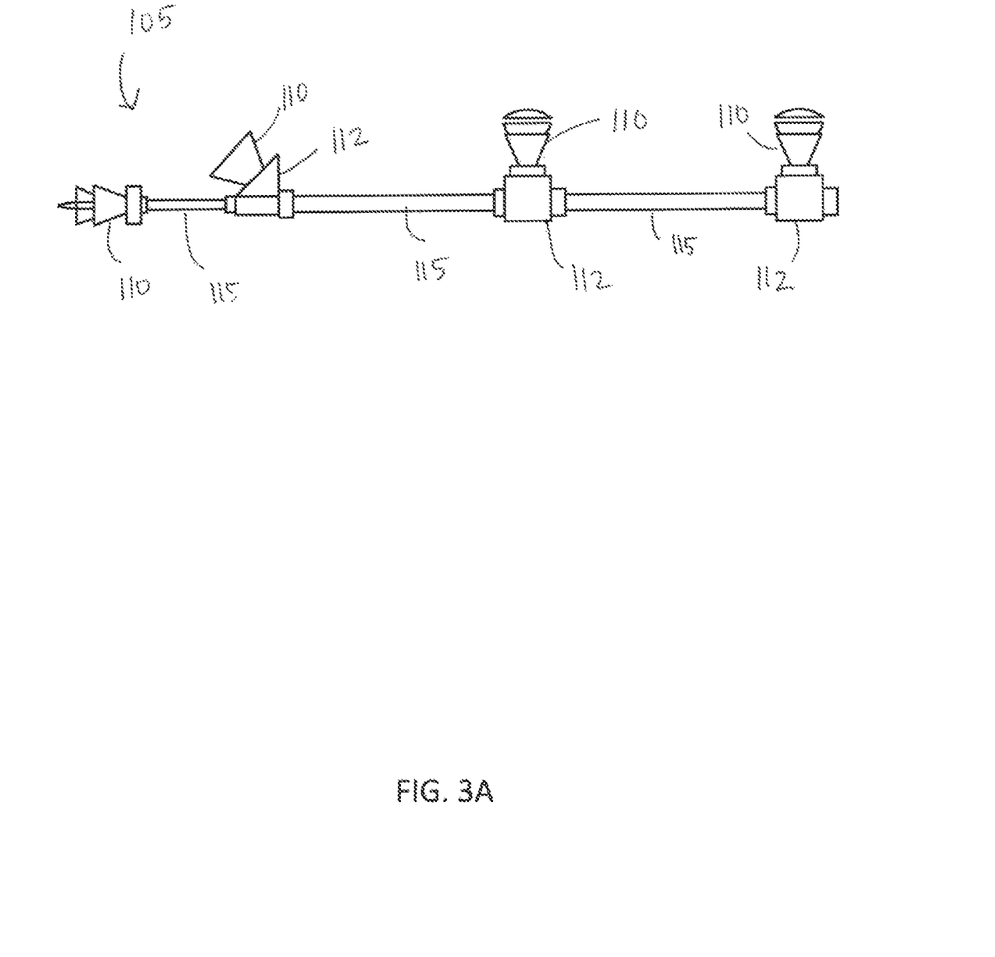
FIG. 3A is a schematic illustration of a monobore multi-port pod missile system according to other embodiments of the invention.

With reference to FIGS. 3 and 3A, the pods 110 may be mounted to a block 112, which may correspondingly be connected on either side to sections of conduit 115 forming the conduit. The flow from the conduit 115 takes high-pressure fluid to the wellhead 150. As with traditional missiles, a blender 140 may be utilized to deliver fracturing fluid to the pumps 120 to be pressurized and delivered to the conduit 115 to be sent to the wellhead 150.

In some embodiments, as illustrated in FIG. 3A, the block 112 may be cut at an angle and the pod 110 mounted to the block 112 such that flow through the pod 110 enters into the conduit 115 at an angle. In still other embodiments, the pods 110 may be positioned on opposing sides of blocks 112 and connected to one or more pumps 120 via input lines 117. Sections of conduit 115 may connect the pods 110 in series as shown and described. In still other embodiments, which will be described in greater detail below with reference to FIGS. 4-6, the pods 110 may be connected directly in line with the sections of conduit 115. In other words, in other embodiments, the pods 110 may be provided without the need for the blocks 112.

Figure 4:
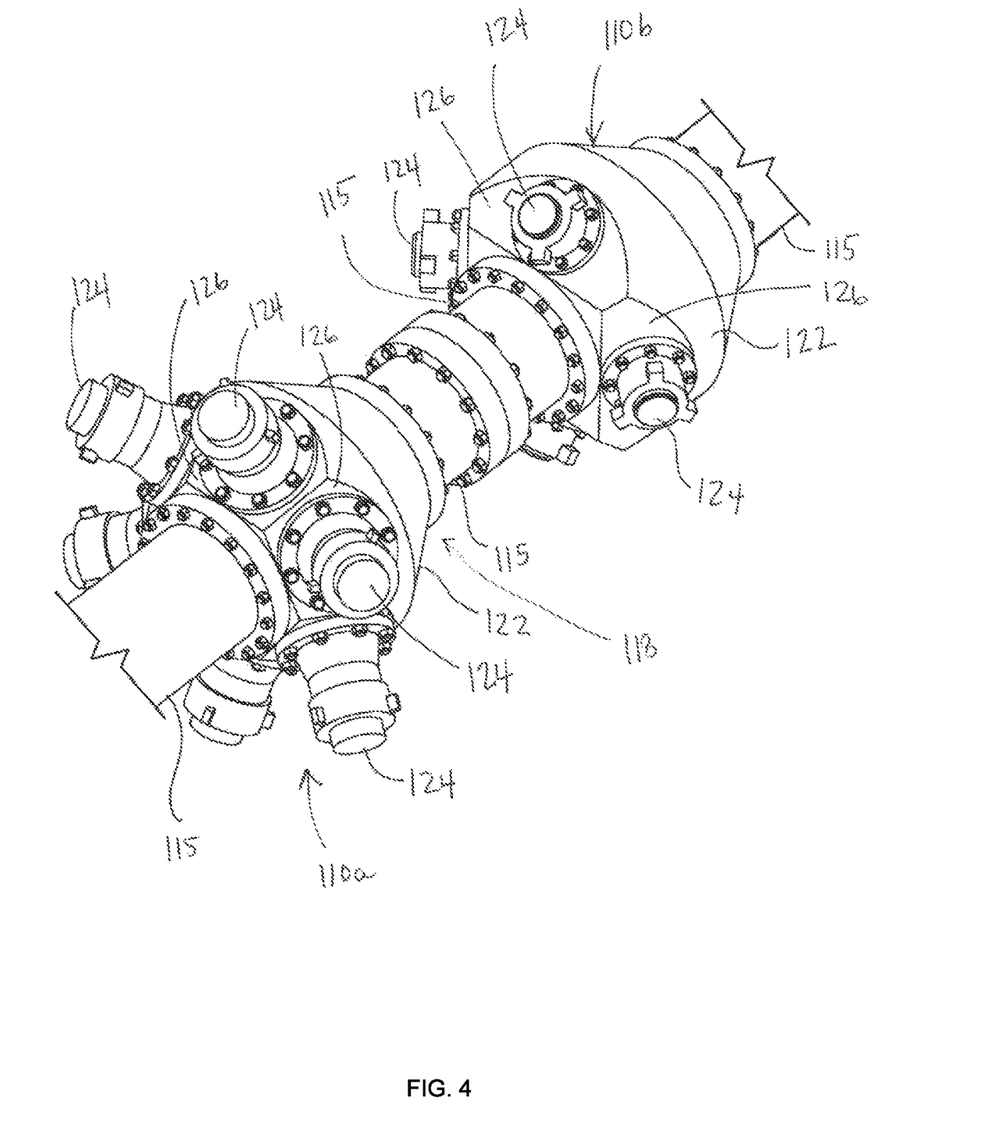
FIG. 4 is a close-up perspective view of a multi-port pod of a monobore multi-port pod missile system according to embodiments of the invention.
Figure 6:
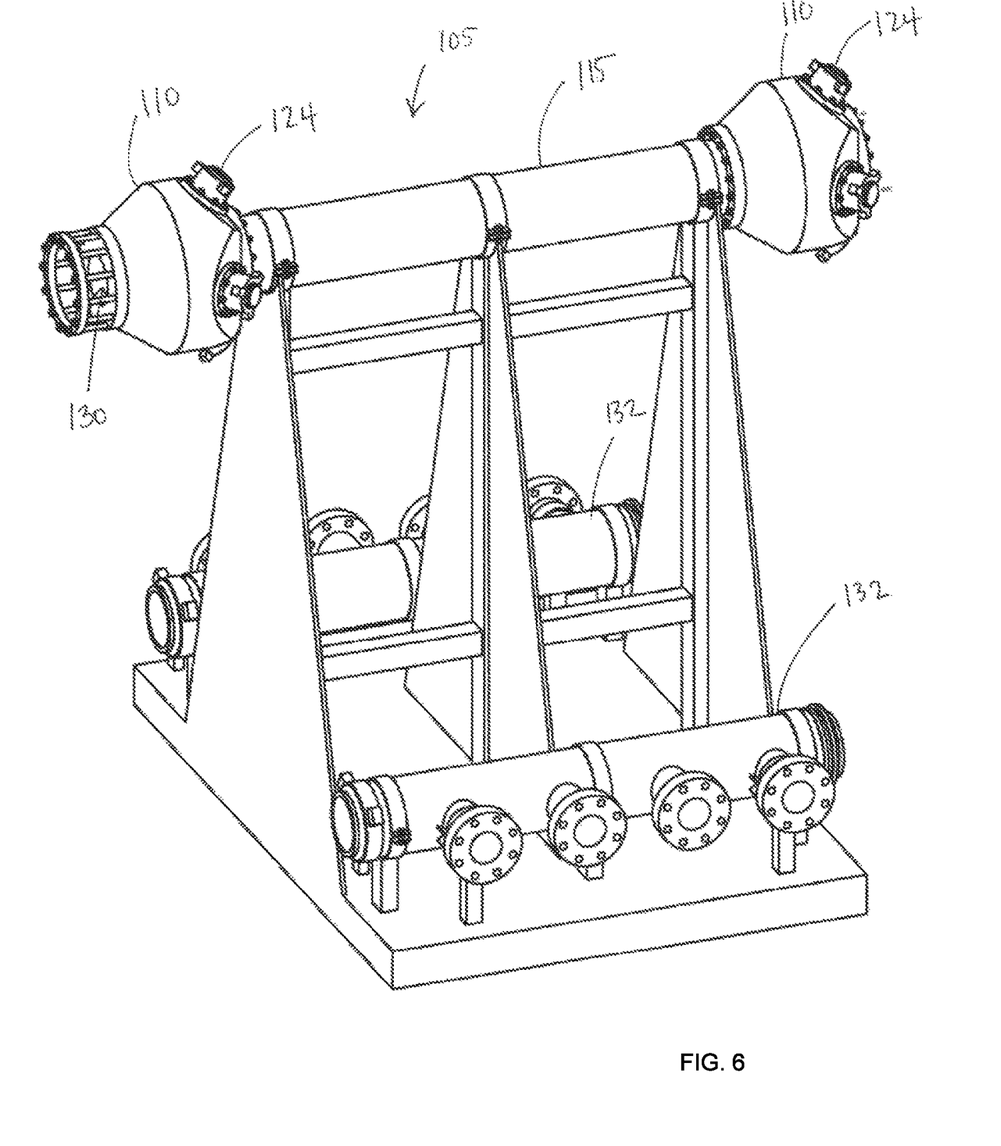
FIG. 6 is a perspective view of a section of a monobore multi-port pod missile system according to embodiments of the invention.

Moving on, as shown most clearly in FIG. 4, each pod 110 is defined by a housing 122 having a plurality of input ports 124 disposed radially around a perimeter of the housing 122. The housing 122 may include one or more angled faces 126 to which each of the input ports 124 is secured. The number of angled faces 126, and therefore input ports 124, may vary. For example, in FIG. 4, the first pod 110a has six faces 126 and six corresponding input ports 124. The second pod 110b has four faces 126 and four corresponding input ports 124. A bore 130 extends through the center of the pod 110 (FIG. 6).

Each pod 110 is designed to combine multiple flow streams into a single flow stream via the input ports 124 at a single junction area 118. Sections of conduit 115 are connected together and run generally parallel to the ground. A section of conduit 115 is connected to each opposing end of a pod 110 such that the opening in the conduit 115 matches with the bore 130 in the pod 110. The pods 110 are thus connected together to form the missile 105.

The portion of the conduit 115 preceding the first pod 110a contains a first flow stream. The first flow stream can be connected to a pump 120 to initiate the first flow in the conduit 115. High pressure input lines 117 from the pumps 120 are connected to the input ports 124. The subsequent flow streams that are introduced to the conduit 115 via the high-pressure input lines 117 in connection with the input ports 124 are radially dispersed around the perimeter of the pod 110. Thus, the subsequent flow streams joined with the fluid in the conduit 115 flow generally in the same direction as the flow stream already in the conduit 115. Because the input lines 117 are radially oriented, the pod 110 itself can be rotated about its axis thereby allowing the input lines 117 to be distributed equally and evenly.

When fluids flow through a tubular conduit, energy losses occur. These losses can be attributed to such principles as surface friction and flow interference. The greater the angle at which fluid streams are merged and joined, the greater the energy loss. And the greater the number of instances that fluid flows are merged, the greater the number of turbulent events and flow interference patterns that are developed. In prior art missiles, such as those disclosed in FIGS. 1 and 2, the angles at which fluid streams are merged are often at or near 90 degrees. And, each input line 12 (or pair of input lines 17 in a monobore system) results in a separate junction area 13, 18 which leads to a high number of turbulent events.

In the MPM 105, each high-pressure input line 117 is connected to the input ports 124 such that the subsequent flow stream enters the first flow stream at an angle less than 90 degrees. In embodiments, the fluid flowing from the high pressure input lines 117 are merged at the location of the pod 110 at angles less than 90 degrees (e.g., about 30-40 degrees, about 40-50 degrees, about 50-60 degrees, about 60-70 degrees, about 70-80 degrees, or about 80-90 degrees) relative to the horizontal axis of the conduit 115, and with an orientation optimized towards direction of flow. Any angle less than 90 degrees produces better results than a subsequent stream entering the first flow stream at 90 degrees (i.e., perpendicular to the flow path). However, the closer the angle gets to 0, the better the results. In one example, three streams may be co-joined at a common confluence point, and all subsequent streams enter the first flow stream at angles near or less than 45 degrees relative to the horizontal axis of the pod 110.

Angling the input ports 124 for the subsequent flow streams is optimal to reduce the number of points where turbulence occurs, thereby reducing overall turbulence within the system. Reducing turbulence also has the benefit of reducing energy loss, associated pressure drops and erosion points in the system. Moreover, the angle of incidence of various surfaces and interfaces within may be aligned to reduce the pressure wave propagation that is detrimental to system performance. The result is that the likelihood of wave interference, resonance, and pump cross talk is reduced.

As one of skill in the art shall understand from the description here, one of the objectives of the MPM 105 is to minimize the number of junctions or confluences 118 where high-pressure fluids from the input lines 117 join the flow in the conduit 115. Still another objective is to minimize the angle at which the input flow joins the flow in the conduit 115. The orientation of the pods 110 along the conduit 115 is configured to first aggregate, collect, and co-join fluids traveling generally parallel to the ground, and second, direct all of the fluid flow in an orientation such that the direction of flow and maximum energy is always focused and oriented in the direction of the flow stream when co-joined. In other words, since fluids enter the conduit 115 in the direction of travel of the fluid already within the conduit 115, turbulent flow (and therefore energy loss) is reduced.

Figure 5:
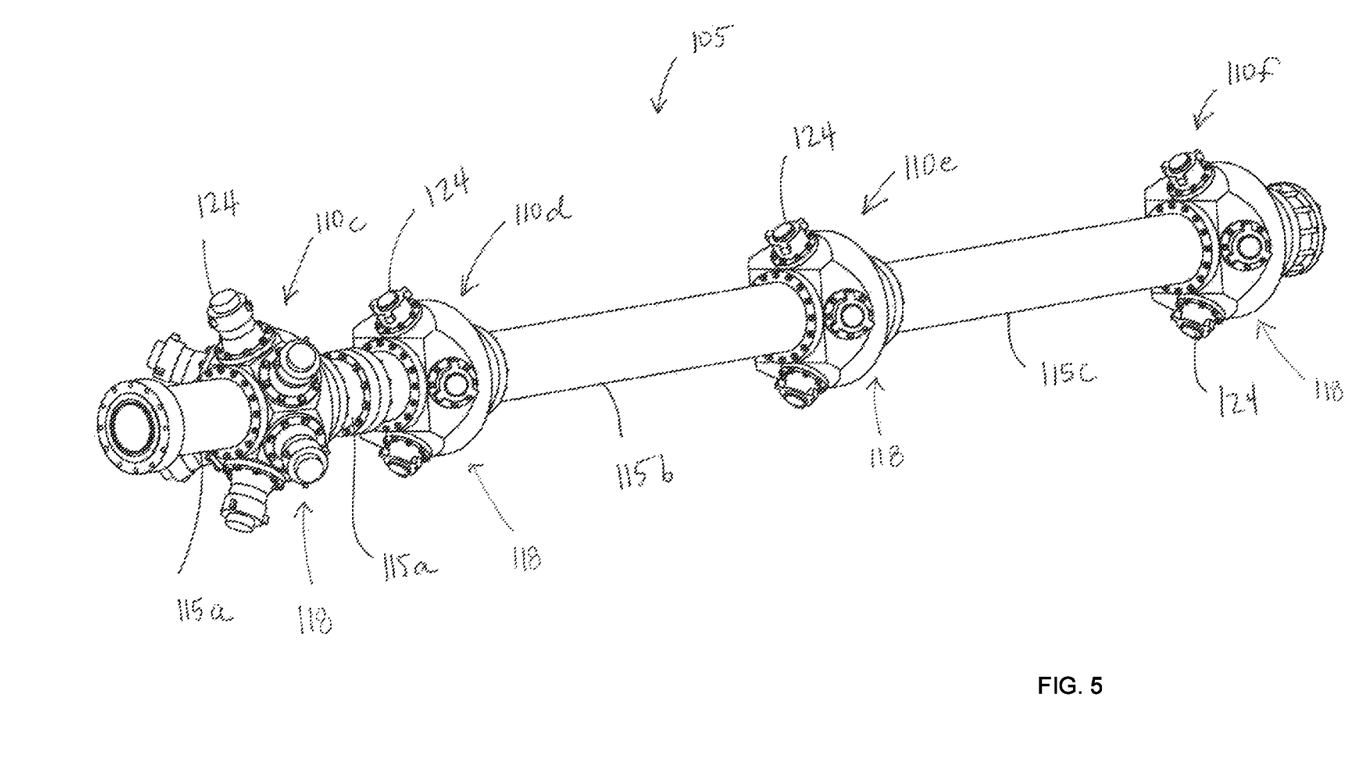
FIG. 5 is a perspective view of several sections of a monobore multi-port pod missile system according to embodiments of the invention.

In FIG. 5, there are four pods 110c, 110d, 110e, and 110f connected with different spacings between them. The spacings may be equal, or any length that is optimal for connection to the associated fracturing pumps and rig up requirements. In this case, the first two pods 110c and 110d are in close proximity, while the second and third, 110d and 110e, and third and fourth pods 110e and 11 Of are more spaced apart. This configuration results in 19 possible inputs 124 for use by hydraulic fracturing trucks. Because the input ports 124 are concentric around a common juncture point (i.e., the center of the pod 110), and the input ports 124 are angled relative to horizontal, the number of regions of significant turbulent flow is limited to only four places—namely, the four locations of the pods. In this particular embodiment, the ratio of input ports to junction points is a ratio of 19:4. For comparison, a traditional missile, such as the missile shown in FIG. 1, has six inputs for use by hydraulic fracturing trucks, and six regions of significant turbulent flow, a ratio of 1:1. In FIG. 2, illustrating a traditional monobore missile, there are eight inputs and 4 regions of significant turbulent flow, a ratio of 2:1.

As subsequent flow streams are joined together with the first flow stream, the first flow stream increases in volume and pressure. To maintain a desired flow rate and pressure within the conduit, the diameter of the conduit 115 may increase in the direction of fluid flow within the conduit. More specifically, the diameter of conduit selected is based on maintaining input and output fluid flow rates from each pod that is in the order of less than 60 feet per second (FPS). The maximum rate possible through any pod is based on some combination of fluid viscosity, fluid chemistry, sand concentration, and pressure. A rate of 60 FPS is generally accepted to limit the likelihood of erosion of system components though higher rates may be possible. Other configurations of pod size are possible to allow for flow and rate increases as the flow stream progress towards the well head and more fluid is aggregated into the MPM system. In embodiments, such as the embodiment illustrated in FIG. 5, the conduit 115*a* leading to pod 110*c* is 5 inches in diameter. The conduit 115*a* between the first pod 110*c* and the second pod 110*d* may likewise be 5 inches in diameter. Between the second pod 110*d* and the third pod 110*e*, the diameter of the conduit 115*b* may increase to 7 inches. The diameter of the conduit 115*c* between the third pod 110*e* and the fourth pod 110*f* may be maintained at 7 inches, or may increase. Of course, those of skill in the art shall understand that the conduit sizes described herein are not specific or required, and other conduit diameters both larger and smaller can be used. Common sizes of conduit which may be used include but are not limited to 4", 5", 7 1/16", and/or 7.5".

As illustrated in FIG. 6, each section may also include one or more low pressure lines 132 to receive low pressure hydraulic fracturing fluid from the blender, then distribute the low-pressure hydraulic fracturing fluid out to the individual hydraulic fracturing pumps. Generally, the low-pressure lines 132 are functionally similar to the low-pressure lines of prior art missiles. Of course, due to the modularity of the system 100 (at least because of the modularity of the MPM 105), the low-pressure lines 132 may also be modular such that the sections can be joined and separated as necessary.

As will be understood by those of skill in the art, as described herein, the pods 110 are modular and may be connected using standard industry connections and conduits, including American Petroleum Institute (API) approved connections and conduits. As each pod 110 has four or more inputs, the number of pods 110 can be selected depending on the number of total connections required for a fracking job. For example, if 20 pumps are required, four pods 110 with six input ports 124 each could be utilized along a length of conduit 115 for a total of 24 input ports 124. If 18 pumps are required, the system may be configured having two pods 110 with four input ports 124 each and two pods 110 with six input ports 124 each for a total of 20 input ports 124. Because of the modularity of the MPM 105, the MPM 105 can be easily customized for each site depending on total hydraulic fracturing pumps that are required. Sections, such as the section illustrated in FIG. 6, can be preassembled and prefabricated off site, transported, and then easily reassembled at the wellsite.

The MPM 105 can be configured such that there are extra connections available on the one or more pods 110 joined to form the MPM 105. The input ports 124 on the pods are multi-functional and may be used for different purposes other than conjoining the high pressure frac fluid flows. For example, the ports can be used as circulation ports, pressure relief ports, or injection ports.

Additionally, as the MPM 105 is modular the pods 110 and associated components can be more easily disassembled and reassembled for inspection, cleaning, et cetera. Furthermore, the position of the pods 110 can be changed as necessary so that flow and rate is balanced.

Additionally, the modular design allows for easy optimization of a dual-stream or split stream fracturing operation, or design of two missiles configured for multi-well fracking. By placing two skids in a side-by-side orientation, the system 105 may be optimized to simultaneously pump fracs on two wells at the same time with greater flexibility and cost effectiveness than traditional missiles. These types of frac jobs are becoming increasingly popular where some pumps are dedicated to one well, and the balance are dedicated to a second well, and the two wells are pumped at the same time. For example, the balance of pump power and rate could be split 30%, 50%, or 60% to pump down one well while the rest of the stream is pumped down the second well. The MPM's modular design allows this method to be expanded to three or more simultaneous well fracs where traditional missiles do not have this capability. Additionally, because the MPM has a split suction manifold some of the pumps can be dedicated to clean fluid and the remaining pumps to dirty fluid thus allowing split stream pumping to occur.

In all cases, the pod 110 configuration has significantly reduced the regions where turbulent flow is encountered, increased the regions where laminar flow is possible, optimized energy flow, and reduced the areas where negative wave generation and interference is possible.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. Further, it will be understood that certain features and subcombinations are of utility and may be employed within the scope of the disclosure. Further, various steps set forth herein may be carried out in orders that differ from those set forth herein with departing from the scope of the claimed methods. This specification shall not be restricted to the above embodiments. Any units of measurement provided herein are exemplary only and are not meant to specifically define the dimensions of the system. Other dimensions may be appropriate or desirable.

The invention claimed is:

1. A multiport pod missile system, comprising:
 a plurality of pipe sections securable together to form a conduit for transporting a high-pressure fluid in a direction of travel;
 a plurality of missile pods secured at a plurality of points between the plurality of pipe sections forming the conduit, the pods comprising four or more input ports extending radially outwardly at an angle from a perimeter of each pod, all input ports being aligned around the perimeter of each pod in a single plane; and
 a plurality of high-pressure fracturing pumps connected to each pod; and
 wherein a selected spacing between each of the plurality of pods is configured according to the number of input ports on each pod and an optimal distance between each pod's plurality of high-pressure fracturing pumps that reduces turbulent flow within the conduit.

2. The missile system of claim 1, wherein the angle of each of the input ports is less than 90 degrees.

3. The missile system of claim 2, wherein the angle of each of the input ports is about 45 degrees.

4. The missile system of claim 1, wherein each pod is secured in-line with the plurality of pipe sections forming the conduit.

5. The missile system of claim 1, wherein a first of the plurality of pipe sections has a diameter that is different from a diameter of a second of the plurality of pipe sections.

6. The missile system of claim 1, wherein a distance between a first pod of the system and a second pod of the system is different from a distance between every other pod of system.

7. The missile system of claim 1, wherein a first group of the plurality of pods comprises a first number of input ports and wherein a second group of the plurality of pods comprises a second number of input ports, and wherein the first number of input ports is different than the second number of input ports.

8. The missile system of claim 7, wherein at least one of the plurality of pods has more than four input ports.

9. The missile system of claim 1, further comprising one or more blocks secured between the plurality of pipe sections, wherein one or more pods are mounted to the one or more blocks.

10. The missile system of claim 9, wherein the blocks have an angled surfaces, the one or more pods being mounted to the angled surfaces.

11. A method of combining high-pressure fluids via a system of multiport pod missiles, comprising:

providing a plurality of multiport missiles comprising at least four input ports extending radially outwardly from a center of each missile and arranged such that all of the input ports are aligned around each missile in a single plane;

securing a first and second end of each missile to sections of pipe which connect each missile in-line with one another;

attaching one or more fluid lines to one or more of the input ports of each missile; and pumping a fluid through the one or more fluid lines into each input port using one or more high-pressure fracturing pumps, wherein the fluid enters the respective section of pipe through the missile at an angle of less than 90 degrees; and wherein a selected spacing between each of the plurality of missiles is configured according to the number of input ports on each missile and an optimal distance between each missile's one or more high-pressure fracturing pumps that reduces turbulent flow within the sections of pipe.

12. The method of claim 11, wherein the angle is about 45 degrees.

13. The method of claim 11, wherein at least one of the plurality of missiles has more than four input ports.

* * * * *